(12) United States Patent
Soomro et al.

(10) Patent No.: US 7,519,032 B2
(45) Date of Patent: Apr. 14, 2009

(54) APPARATUS AND METHOD FOR PROVIDING QOS SERVICE SCHEDULE AND BANDWIDTH ALLOCATION TO A WIRELESS STATION

(75) Inventors: Amjad Soomro, Hopewell Junction, NY (US); Kiran Challapali, New City, NY (US); Javier Del Prado Pavon, Ossining, NY (US); Saishankar Nandagopalan, Tarrytown, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1551 days.

(21) Appl. No.: 10/314,576

(22) Filed: Dec. 9, 2002

(65) Prior Publication Data
US 2004/0042435 A1  Mar. 4, 2004

Related U.S. Application Data

(60) Provisional application No. 60/408,004, filed on Sep. 4, 2002.

(51) Int. Cl.
*H04Q 7/24* (2006.01)
(52) U.S. Cl. .................. 370/338; 370/311; 370/329; 370/445; 370/465; 370/447; 370/449; 370/395.21; 370/395.4; 370/395.41; 455/574; 455/452.2
(58) Field of Classification Search .................. 370/338, 370/311, 329, 346, 349, 445, 447, 449, 465, 370/395.21, 332; 455/452.2
See application file for complete search history.

(56) References Cited

U.S. PATENT DOCUMENTS

| 6,449,488 B1 * | 9/2002 | Cheng et al. ............ 455/466 |
| 6,452,915 B1 * | 9/2002 | Jorgensen .............. 370/338 |
| 6,567,660 B1 * | 5/2003 | Wegener .............. 455/418 |
| 6,747,968 B1 * | 6/2004 | Seppala et al. .......... 370/338 |
| 6,754,210 B1 * | 6/2004 | Ofek .................. 370/389 |
| 6,804,222 B1 * | 10/2004 | Lin et al. .............. 370/338 |
| 6,845,100 B1 * | 1/2005 | Rinne ................ 370/395.43 |
| 6,865,609 B1 * | 3/2005 | Gubbi et al. ............ 709/230 |

(Continued)

FOREIGN PATENT DOCUMENTS

EP    1 187 380    3/2002

(Continued)

OTHER PUBLICATIONS

Havinga, Paul: "Energy-Efficient Adaptive Wireless Network Design" Computers And Communications, 2000. Proceedings. ISCC 2000. Fifth IEEE Symposium On, Apr. 3, 2000.

(Continued)

*Primary Examiner*—Marceau Milord
(74) *Attorney, Agent, or Firm*—Michael E. Belk (57) ABSTRACT

An apparatus and method is disclosed for providing a Quality of Service (QoS) service schedule and bandwidth allocation message to a wireless station in a wireless network. The apparatus of the invention comprises a hybrid coordinator that is capable of (1) creating a Quality of Service (QoS) service schedule and a bandwidth allocation message for a wireless station and (2) sending the QoS service schedule and the bandwidth allocation message to the wireless station. The wireless station is capable of using the scheduling information to perform power management by entering a power save mode during times when the hybrid coordinator has not scheduled any transmission opportunities.

20 Claims, 8 Drawing Sheets

U.S. PATENT DOCUMENTS

| | | | |
|---|---|---|---|
| 6,970,682 B2 * | 11/2005 | Crilly et al. | 455/78 |
| 7,039,032 B1 * | 5/2006 | Ho et al. | 370/338 |
| 7,058,074 B2 * | 6/2006 | Ho et al. | 370/447 |
| 7,136,361 B2 * | 11/2006 | Benveniste | 370/310.2 |
| 7,180,905 B2 * | 2/2007 | Benveniste | 370/445 |
| 7,221,681 B2 * | 5/2007 | Choi et al. | 370/447 |
| 7,245,592 B2 * | 7/2007 | Soomro et al. | 370/311 |
| 7,245,604 B2 * | 7/2007 | Benveniste | 370/338 |
| 7,245,605 B2 * | 7/2007 | Benveniste | 370/338 |
| 7,248,600 B2 * | 7/2007 | Benveniste | 370/445 |
| 7,277,413 B2 * | 10/2007 | Benveniste | 370/338 |
| 7,277,415 B2 * | 10/2007 | Benveniste | 370/338 |
| 7,280,517 B2 * | 10/2007 | Benveniste | 370/338 |
| 7,289,529 B2 * | 10/2007 | Sherman | 370/461 |
| 7,330,472 B2 * | 2/2008 | Kowalski | 370/395.21 |
| 2002/0071449 A1 * | 6/2002 | Ho et al. | 370/447 |
| 2002/0075806 A1 | 6/2002 | Shalvi et al. | 370/235 |
| 2002/0093929 A1 | 7/2002 | Magold et al. | 370/336 |
| 2003/0012166 A1 * | 1/2003 | Benveniste | 370/338 |

FOREIGN PATENT DOCUMENTS

WO    WO 98 37706    8/1998

OTHER PUBLICATIONS

"Energy Efficient Protocols for Wireless Systems", by Prathima Agrawal, 1998, pp. 564-569.

* cited by examiner

FIG. 1
PRIOR ART

OPEN SYSTEMS INTERCONNECTION (OSI) LAYERS

| ELEMENT ID (13) | LENGTH (44) | TS INFO | NOMINAL MSDU SIZE | MAXIMUM MSDU SIZE | MINIMUM SERVICE INTERVAL | MAXIMUM SERVICE INTERVAL | INACTIVITY INTERVAL | MINIMUM DATA RATE |
|---|---|---|---|---|---|---|---|---|
| 1 OCTET | 1 OCTET | 2 OCTETS | 2 OCTETS | 2 OCTETS | 4 OCTETS | 4 OCTETS | 4 OCTETS | 4 OCTETS |

| MEAN DATA RATE | MAXIMUM BURST SIZE | MINIMUM PHY RATE | PEAK DATA RATE | DELAY BOUND | SURPLUS BANDWIDTH ALLOWANCE |
|---|---|---|---|---|---|
| 4 OCTETS | 4 OCTETS | 4 OCTETS | 4 OCTETS | 1 OCTET | 1 OCTET |

500

TRAFFIC SPECIFICATION ELEMENT

FIG. 5
PRIOR ART

SCHEDULE ELEMENT

FIG. 6

SCHEDULE QoS MANAGEMENT ACTION FRAME FORMAT

APPARATUS AND METHOD FOR PROVIDING QOS SERVICE SCHEDULE AND BANDWIDTH ALLOCATION TO A WIRELESS STATION

PRIORITY CLAIM TO PROVISIONAL PATENT APPLICATION

This patent application is related to U.S. patent application Ser. No. 10/314,623, filed Dec. 9, 2002 and incorporated herein by reference for all purposes entitled "Apparatus and Method for Announcing A Pending QoS Service Schedule to a Wireless Station."

REFERENCE TO RELATED PATENT APPLICATION

This patent application is related to U.S. patent application Ser. No. filed concurrently herewith and incorporated herein by reference for all purposes entitled "Apparatus and Method for Announcing A Pending QoS Service Schedule to a Wireless Station."

TECHNICAL FIELD OF THE INVENTION

The present invention is generally directed to communications systems, and, in particular, to an apparatus and method for providing a Quality of Service (QoS) service schedule and bandwidth allocation message to a wireless station in a wireless network.

BACKGROUND OF THE INVENTION

The development of high quality multimedia devices, such as set-top boxes, high end televisions, digital televisions, personal televisions, storage products, personal digital assistants (PDAs), wireless Internet devices, etc., is leading to a variety of architectures and to more openness towards new features for these devices. The development of these new multimedia products ensures that the public will continue to increase its demand for multimedia services. Network designers and engineers are therefore continuing to design systems that are capable of meeting the increasing demand for both real time and non-real time multimedia transfer across integrated networks.

The Internet Protocol (IP)-based Internet provides a "best effort" data delivery service that does not guarantee any service level to the users. A "best effort" service over the IP network allows the complexity to stay at the end-hosts, so that the network can remain simple. The phenomenal growth of the Internet shows that this approach scales well.

On the other hand, in recent years, the IEEE 802.11 wireless local area network (WLAN) has emerged as a prevailing technology for the (indoor) broadband wireless access for mobile/portable devices. IEEE 802.11 can be considered a wireless version of "Ethernet" by virtue of supporting a "best effort" service. The IEEE 802.11 Working Group is currently defining a new supplement to the existing legacy 802.11 Medium Access Control (MAC) layer in order to support Quality of Service (QoS). The new 802.11e MAC will expand the 802.11 application domain by enabling such applications as voice and video services over wireless local area networks (WLANs).

The new IEEE 802.11e standard will constitute the industry's first true universal wireless standard supporting QoS. IEEE 802.11e will offer seamless interoperability across home, enterprise, and public access networking environments, yet still offer features that meet the unique needs of each type of network. Unlike other wireless initiatives, IEEE 802.11e is the first wireless standard that spans home and business environments by adding QoS features and multimedia support to the existing IEEE 802.11 standard, while maintaining full backward compatibility with the legacy standard.

The QoS support for multimedia traffic is critical to wireless home networks where voice, audio, and video will be delivered across multiple networked home electronic devices and personal computers. Broadband service providers view QoS and multimedia-capable home networks as an essential ingredient to offering residential customers value-added services such as video on demand, audio on demand, voice over IP and high speed Internet access.

In order to provide adequate service, some level of quantitative and qualitative determinations of the types of network services will be required. This requires adding some capability to the network to enable the network to distinguish traffic with strict timing requirements on delay, jitter and loss from other types of traffic. This is what the protocols for QoS provisioning are designed to achieve. QoS provisioning does not create bandwidth, but manages bandwidth more effectively to meet a wide range of application requirements. The goal of QoS provisioning is to provide some level of predictability and control beyond the current IP "best effort" service.

The presently existing IEEE 802.11e standard (D3.2 of July 2002) sets forth a protocol for negotiating QoS requirements for traffic streams. The D3.2 version of the IEEE 802.11e standard of July 2002 is hereby incorporated within this patent document by reference. The D3.2 version of the IEEE 802.11e standard of July 2002 will be referred to as the "D3.2 Standard." A scheduler in a hybrid coordinator has the responsibility for determining the service schedule for each wireless station (WSTA). The scheduling is carried out so that the individual pre-negotiated QoS requirements are met. In the D3.2 Standard the service schedule is retained within the hybrid coordinator and is not made known outside of the hybrid coordinator. The actual determination of the service schedule is an algorithmic issue and is not addressed by the D3.2 Standard.

Because the service schedule that is determined by the hybrid coordinator (in the D3.2 Standard) is not known to the wireless stations, each Quality of Service (QoS) wireless station (QSTA) does not know when to expect a traffic opportunity (TXOP) to either receive downlink traffic or send uplink traffic (or send sidelink traffic). This is a problem because it is advantageous for a wireless station to conserve power by frequently entering a "power save" mode (also referred to as a "sleep" mode). The wireless station is not able to send or receive traffic when the wireless station is in the "power save" mode.

If the wireless station had prior knowledge of the service schedule within the hybrid coordinator, then the wireless station could enter into a "power save" mode when transmission opportunities (TXOPs) are not scheduled by the hybrid coordinator.

There is therefore a need in the art for an apparatus and method that will enable a wireless station in a wireless network to receive a service schedule and bandwidth allocation message from a hybrid coordinator.

SUMMARY OF THE INVENTION

The present invention generally comprises an apparatus and method for providing a Quality of Service (QoS) service schedule and bandwidth allocation message to a wireless station in a wireless network.

In an advantageous embodiment of the present invention, the apparatus of the invention comprises a hybrid coordinator that is capable of (1) creating a Quality of Service (QoS) service schedule and a bandwidth allocation message for a wireless station and (2) sending the QoS service schedule and the bandwidth allocation message to the wireless station. The wireless station is capable of using the scheduling information to perform power management by entering a power save mode during times when the hybrid coordinator has not scheduled any transmission opportunities. The wireless station may also use the scheduling information for other purposes such as prior scheduling of internally queued data.

It is a primary object of the present invention to provide an apparatus and method for providing a Quality of Service (QoS) service schedule to a wireless station in a wireless network.

It is another object of the present invention to provide an apparatus and method for updating a Quality of Service (QoS) service schedule in a wireless station in a wireless network.

It is an additional object of the present invention to provide an apparatus and method for using a Quality of Service (QoS) service schedule in a wireless station to perform power management by entering a power save mode during times when transmission opportunities have not been scheduled by a hybrid coordinator.

It is another object of the present invention to provide an apparatus and method for providing a Quality of Service (QoS) bandwidth allocation message to a wireless station in a wireless network.

The foregoing has outlined rather broadly the features and technical advantages of the present invention so that those skilled in the art may better understand the Detailed Description of the Invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments set forth in this patent document to describe the principles of the improved system and method of the present invention are by way of illustration only and should not be construed in any way to limit the scope of the invention. Those skilled in the art will readily understand that the principles of the present invention may also be successfully applied in any type of wireless network system.

Figure 1:
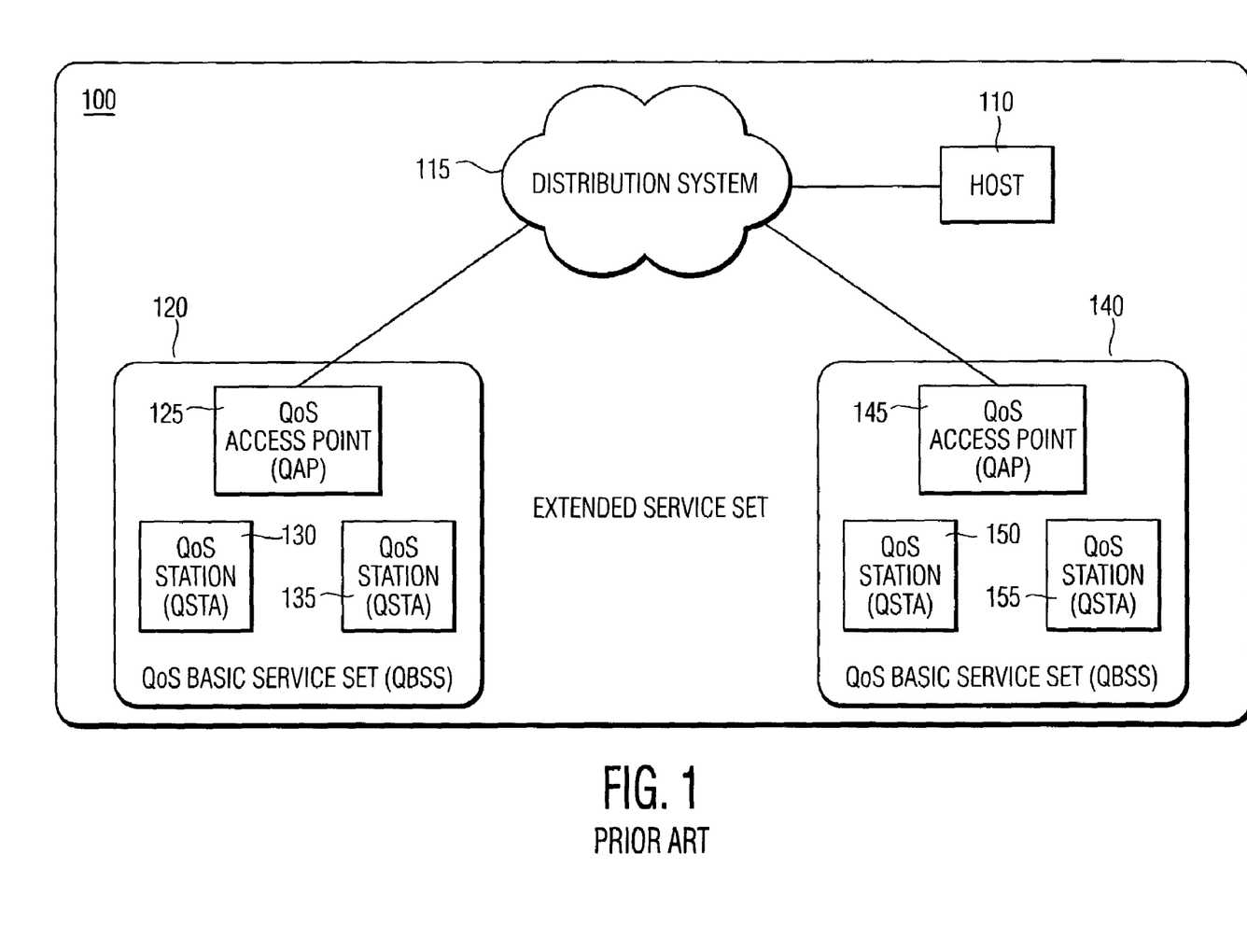
FIG. 1 illustrates an exemplary prior art extended service set of a wireless local area network (WLAN) comprising a host, a distribution system, a first Quality of Service (QoS) basic service set (QBSS), and a second Quality of Service (QoS) basic service set.

FIG. 1 illustrates an exemplary prior art extended service set 100 of a wireless local area network (WLAN). Extended service set 100 comprises host 110, distribution system 115, a first Quality of Service (QoS) basic service set (QBSS) 120, and a second Quality of Service (QoS) basic service set (QBSS) 140. A QoS basic service set (QBSS) comprises a number of wireless QoS stations (QSTA) that execute the same Medium Access Control (MAC) protocol and compete for access to the same shared medium. A QBSS may be isolated or it may be connected to a distribution system. Typically, a distribution system is a wired backbone local area network (LAN).

A Quality of Service (QoS) Access Point (QAP) is a wireless QoS station that is connected to a distribution system. The QAP functions as a bridge between a QBSS and the distribution system. The MAC protocol of a QBSS may be fully distributed or controlled by a central coordination function within the QAP of the QBSS. As shown in FIG. 1, QBSS 120 is connected to distribution system 115 through QAP 125 and QBSS 140 is connected to distribution system 115 through QAP 145.

Figure 2:
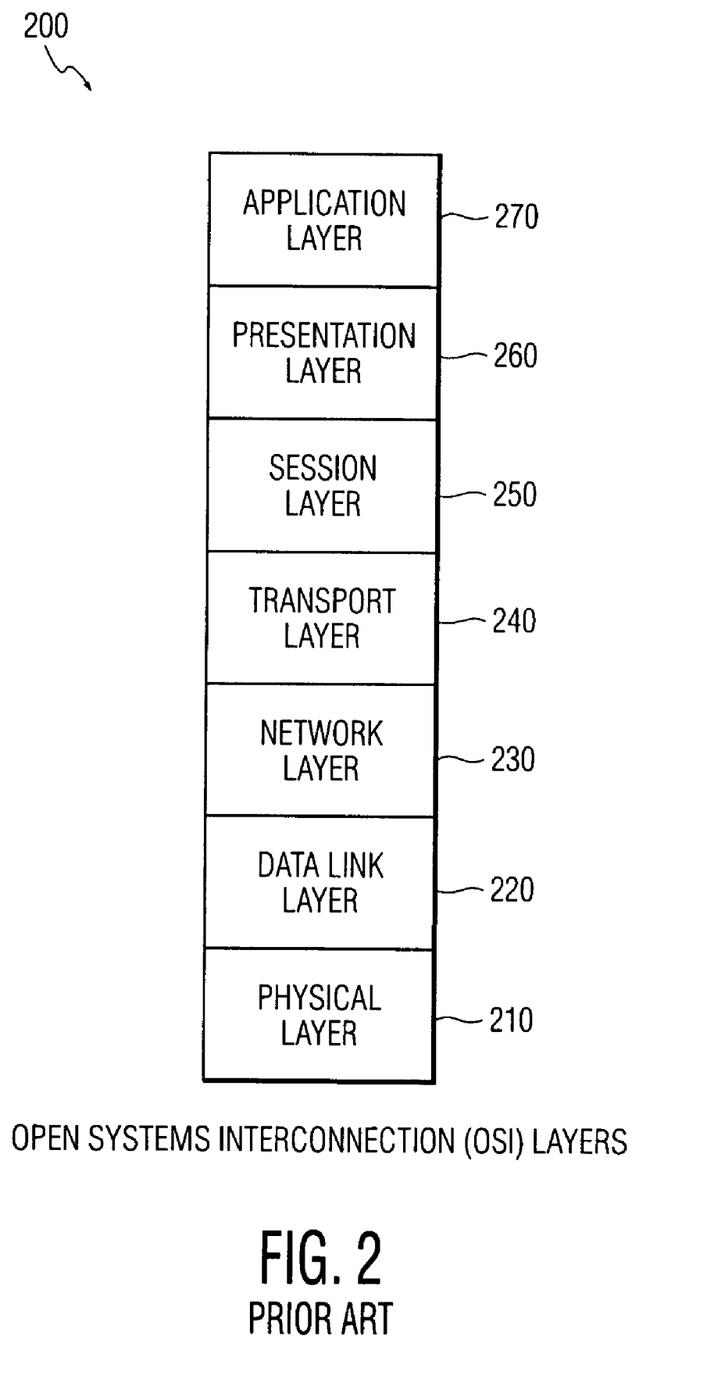
FIG. 2 illustrates seven prior art Open Systems Interconnection (OSI) network layers.

FIG. 2 illustrates seven prior art Open Systems Interconnection (OSI) network layers. These layers are well known in the art and are included here for reference. The first layer is Physical Layer 210, the second layer is Data Link Layer 220, the third layer is Network Layer 230, the fourth layer is Transport Layer 240, the fifth layer is Session Layer 250, the sixth layer is Presentation Layer 260, and the seventh layer is Application Layer 270.

Figure 3:
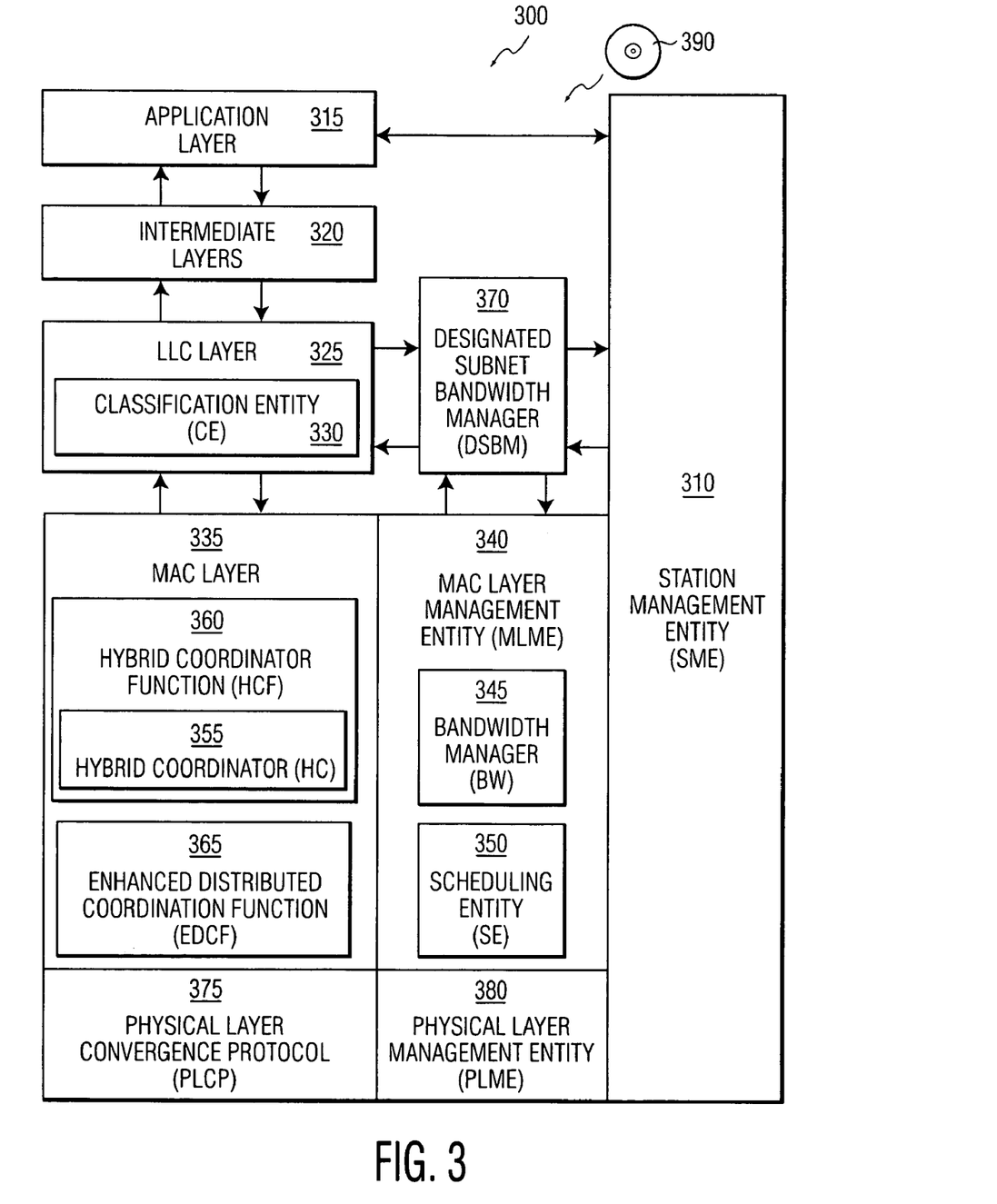
FIG. 3 illustrates an exemplary architecture of a Quality of Service (QoS) wireless station in accordance with the principles of the present invention.

FIG. 3 illustrates an exemplary architecture 300 of a Quality of Service (QoS) wireless station (QSTA) in accordance with the principles of the present invention. Many of the elements of this architecture are well known in the art. Station Management Entity (SME) 310 extends from the Application Layer to the Physical Layer. The Physical Layer is represented in FIG. 3 by Physical Layer Convergence Protocol (PLCP) 375 and Physical Layer Management Entity (PLME) 380. MAC Layer 335 is located above the Physical Layer Convergence Protocol (PLCP) 375. MAC Layer Management Entity (MLME) 340 is located above the Physical Layer Management Entity (PLME) 380.

The Logical Link Control Layer (LLC Layer) 325 is located above MAC Layer 335. LLC Layer 325 comprises Classification Entity (CE) 330. Intermediate Layers 320 are located above LLC Layer 325. Application Layer 315 is located above Intermediate Layers 320.

MAC Layer 335 comprises Hybrid Coordination Function (HCF) 360. Hybrid Coordination Function (HCF) 360 comprises Hybrid Coordinator (HC) 355. MAC layer 335 also comprises Enhanced Distributed Coordination Function (EDCF) 365. MAC Layer Management Function (MLME) 340 comprises Bandwidth Manager (BM) 345 and Scheduling Entity (SE) 350.

Designated Subnet Bandwidth Manager (DSBM) 370 is located above MAC Layer Management Function (MLME) 340. Designated Subnet Bandwidth Manager (DSBM) 370 is capable of communicating with LLC Layer 330, MAC Layer Management Function (MLME) 340, and Station Management Entity (SME) 310.

As will be more fully described, the Hybrid Coordinator 355 of the present invention is capable of providing a Quality of Service (QoS) service schedule and bandwidth allocation message to a Quality of Service (QoS) wireless station (e.g., QSTA 130) in wireless local area network 100.

The MAC layer 335 defines a Hybrid Coordination Function (HCF) 360 and an Enhanced Distributed Coordination Function (EDCF) 365. EDCF 365 is so named due to its root to the legacy DCF (i.e., the legacy IEEE 802.11 MAC). HCF 360 and EDCF 365 are usually located in the QoS Access Point (e.g., QAP 120).

EDCF 365 is based on a listen-before-talk protocol called Carrier Sense Multiple Access with Collision Avoidance (CSMA/CA) where a frame can be transmitted after listening to the channel for a random amount of time. It provides differentiated channel access to frames of different priorities as labeled by a higher layer. Due to the nature of the distributed contention based channel access along with the uncertainty of the wireless medium, EDCF 365 cannot guarantee any rigid QoS. However, it provides so-called "prioritized" QoS that can be useful for applications that can live with statistical frame losses. With EDCF 365, a single MAC 335 can have multiple queues that work independently, in parallel, for different priorities. Frames with different priorities are transmitted using different CSMS/CA contention parameters. That is, basically a frame with a higher priority is transmitted after listening to the channel for a probabilistically shorter period than frames with lower priorities. Note that the concept of a stream supported by EDCF 365 does not exist. Each individual frame is treated relatively based on its corresponding priority.

The controlled channel access of the HCF is based on a poll-and-response protocol in which a QSTA transmits its pending frame when it receives a polling frame from the HC. As the QSTAs contend for the channel according to the EDCF channel access, the HC is given the highest priority for the channel contention. That is, the HC is subject to winning the contention by listening to the channel for a shorter time than any other QSTA before its transmission of a downlink frame or a polling frame. By polling a QSTA, the HC grants a polled transmission opportunity (TXOP) to the QSTA, where a TXOP represents a specific amount of time during which the polled QSTA, called the TXOP holder, assumes control over the channel. The duration of a polled TXOP is specified in the particular polling frame. That is, during a polled TXOP, the TXOP holder can transmit multiple frames as long as the total duration for such transactions is not over the polled TXOP duration.

Thanks to the centrally controlled characteristics, the HCF can be used for the so-called "parameterized" QoS along with "prioritized" QoS. To support the parameterized QoS, the HC and the QSTA (or QSTAs) set up a (layer-2 wireless link) stream along with the traffic characteristics and QoS requirements of the particular stream. Once such a stream is set up, the HC attempts to grant the TXOPs to the corresponding QSTAs (if the stream is from QSTA to QSTA or from QSTA to HC) or transmit the frames (if the stream is from HC to QSTA) according to the agreed specification.

Figure 4:
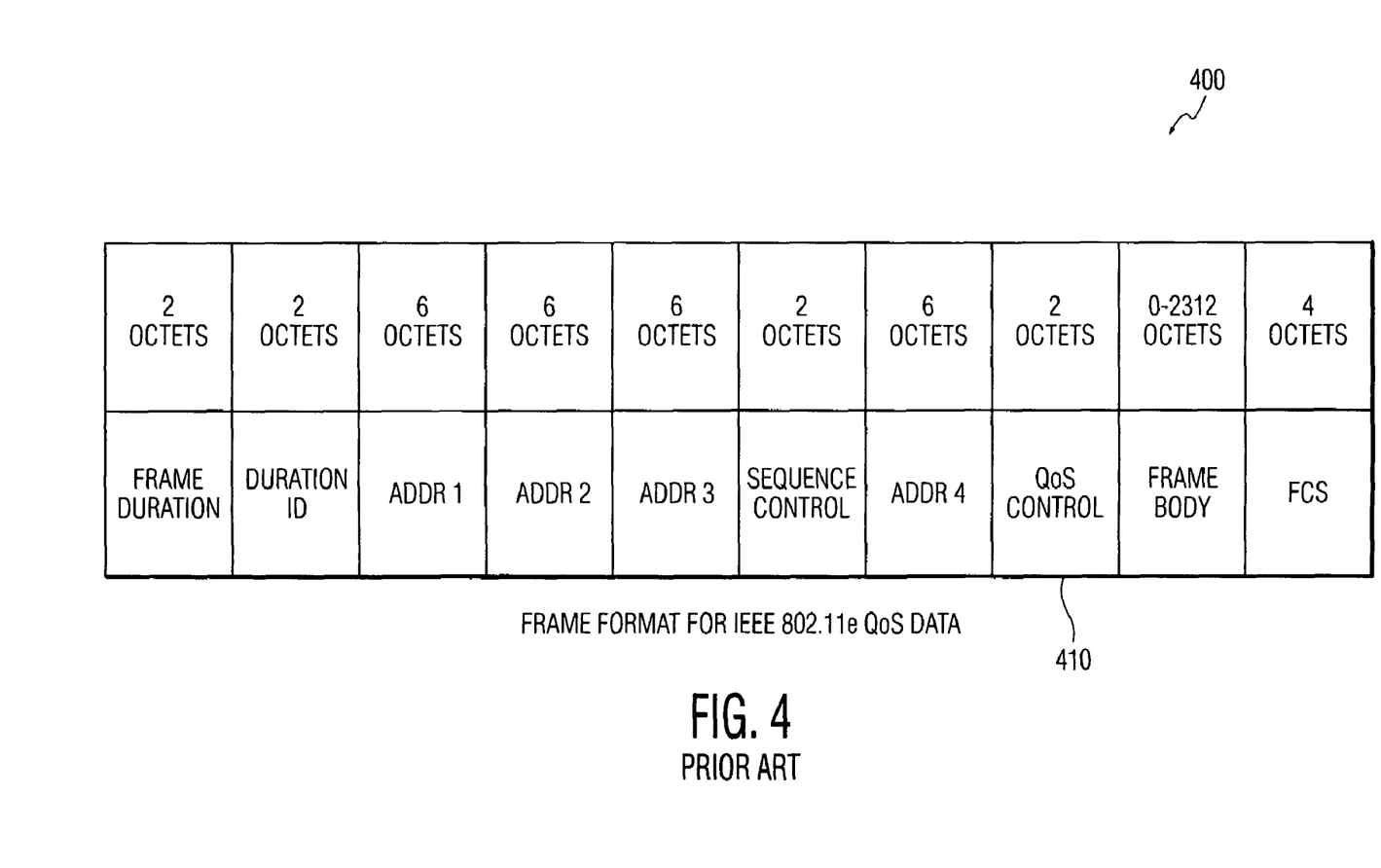
FIG. 4 illustrates a prior art frame format for IEEE 802.11e Quality of Service (QoS) data.

FIG. 4 illustrates a prior art frame format for IEEE 802.11e Quality of Service (QoS) data. Each single QoS data frame carries a Traffic Identifier (TID) value that identifies the priority of the frame for prioritized QoS or the corresponding traffic stream for parameterized QoS. To carry such information, the IEEE 802.11e QoS data frame header comprises a two (2) octet QoS control field 410 as shown in FIG. 4. The QoS control field uses four (4) bits to indicate the TID value and also carries some other QoS related information. For example, the status of the queue, which the specific frame was dequeued from, is also indicated to aid the TXOP grant scheduling of the HC.

Two types of QoS action management frames are defined to set up, modify, and delete traffic streams. The first type includes Add TS Request and Response QoS action frames that are used to set up or modify a QoS stream. The second type includes Delete TS Request and Response QoS action frames that are used to delete a QoS stream. Each QoS action management frame indicates the Traffic specification (TSPEC) information element to communicate the corresponding QoS requirements and traffic specifications.

Figure 5:
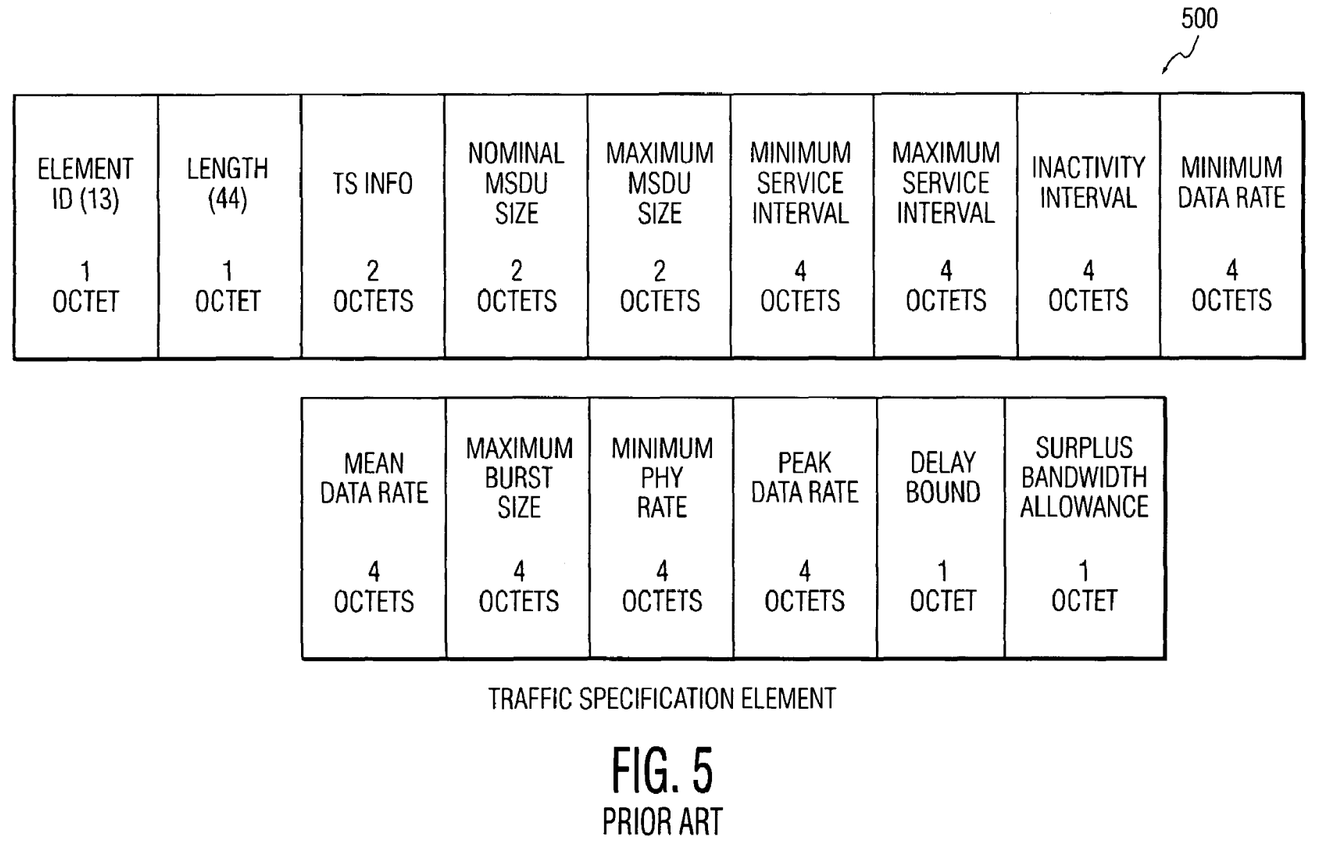
FIG. 5 illustrates a prior art frame format for an IEEE 802.11e Traffic Specification Element.

FIG. 5 illustrates a prior art frame format for a Traffic Specification (TSPEC) Element. Traffic Specification (TSPEC) Element 500 contains the set of parameters that define the characteristics and QoS expectations of a unidirectional traffic stream, in the context of a particular wireless station (WSTA), for use by the Hybrid Coordinator (HC) and wireless stations (WSTAs), in support of a parameterized QoS traffic transfer. The Traffic Specification (TSPEC) Element information field comprises the items shown in FIG. 5. Traffic Specification (TSPEC) Element 500 allows a set of parameters more extensive than may be needed, or may be available, for any particular instance of parameterized QoS traffic. The fields are set to zero (0) for any unspecified parameter values.

The presently existing IEEE 802.11e standard (D3.2 of July 2002) sets forth a protocol for negotiating QoS requirements for traffic streams. The D3.2 version of the IEEE 802.11e standard of July 2002 will be referred to as the "D3.2 Standard." A scheduler in the Hybrid Coordinator has the responsibility for determining the service schedule for each wireless station (WSTA). The scheduling is carried out so that the individual pre-negotiated QoS requirements are met. In the D3.2 Standard the service schedule is retained within the Hybrid Coordinator and is not made known outside of the Hybrid Coordinator. The actual determination of the service schedule is an algorithmic issue and is not addressed by the D3.2 Standard.

Because the service schedule that is determined by the Hybrid Coordinator (in the D3.2 Standard) is not known to the wireless stations, each Quality of Service (QoS) wireless station (QSTA) does not know when to expect a traffic opportunity (TXOP) to either receive downlink traffic or send uplink traffic (or send sidelink traffic). This is a problem because it is advantageous for a wireless station (e.g., QSTA 130) to conserve power by frequently entering a "power save" mode (also referred to as a "sleep" mode). The wireless station is not able to send or receive traffic when the wireless station is in the "power save" mode.

If the wireless station had prior knowledge of the service schedule within the Hybrid Coordinator, then the wireless station could enter into a "power save" mode when transmission opportunities (TXOPs) are not scheduled by the Hybrid Coordinator.

The apparatus and method of the present invention provides a wireless station with the schedule information within the Hybrid Coordinator by sending a Quality of Service (QoS) service schedule and bandwidth allocation message to the wireless station. The wireless station may use the schedule information for (1) power level management, or (2) prior scheduling of internally queued data, or (3) any other purpose.

Figure 6:
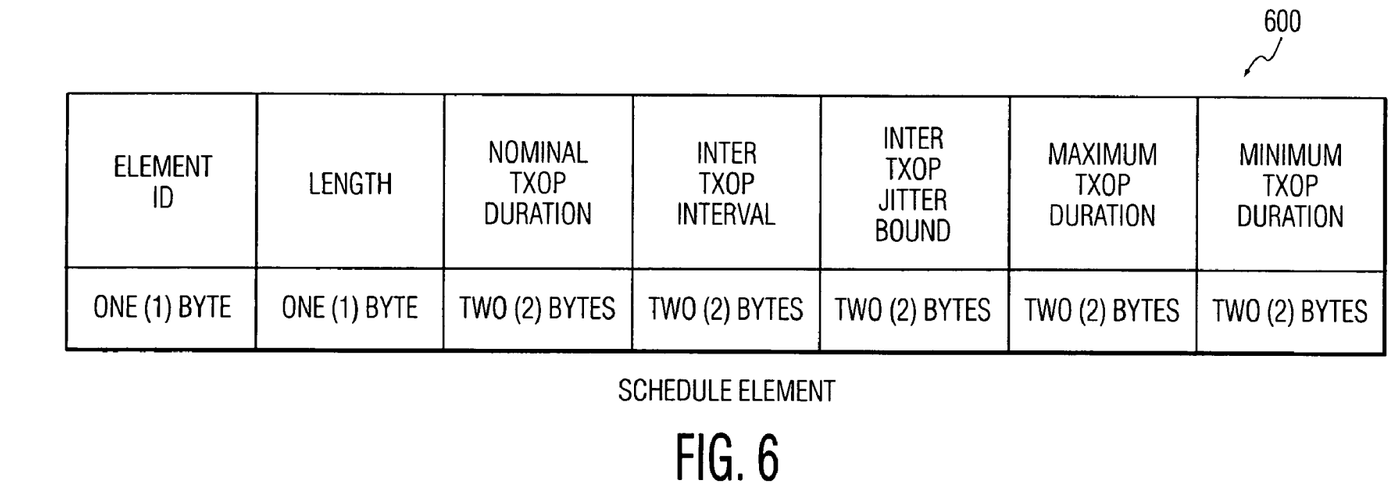
FIG. 6 illustrates an exemplary Schedule Element of the present invention.

The QoS service schedule and bandwidth allocation message comprises a Schedule Element 600 as shown in FIG. 6. Schedule Element 600 comprises the following information: Element Identification (ID), Length, Nominal TXOP Duration, Inter TXOP Interval, Inter TXOP Jitter Bound, Maximum TXOP Duration, and Minimum TXOP Duration. The QoS service schedule inherently comprises a bandwidth allocation message to a wireless station because the QoS service schedule specifies a period of time in which a wireless station may send or receive traffic. Therefore the QoS service schedule may be referred to as a QoS service schedule and bandwidth allocation message.

Figure 7:
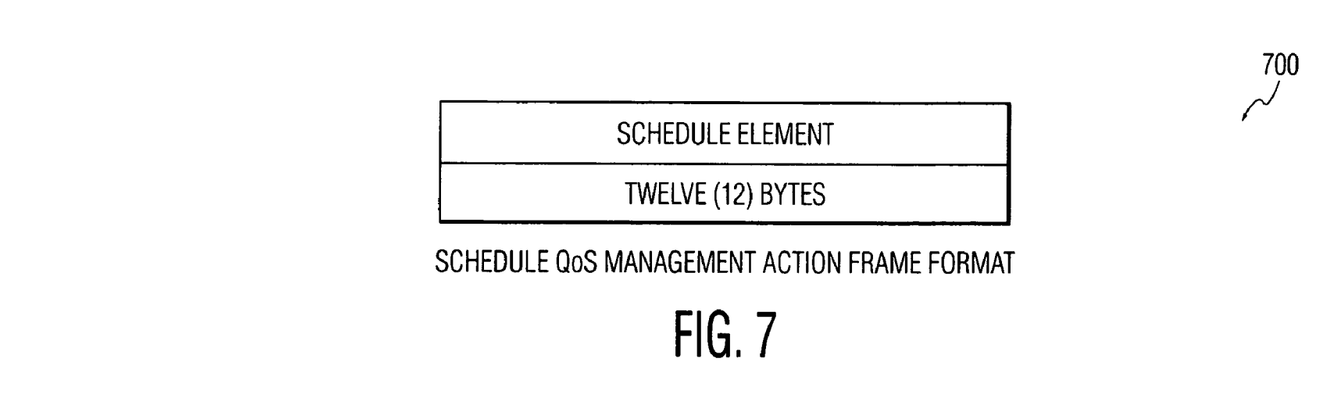
FIG. 7 illustrates an exemplary frame format for a Schedule QoS Management Action of the present invention.

Schedule Element 600 is sent to wireless stations in a Schedule QoS Management Action Frame 700 as shown in FIG. 7. Schedule QoS Management Action Frame 700 may be sent from the Hybrid Coordinator to the wireless stations either periodically or aperiodically. The Schedule QoS Management Action Frame 700 may also be sent from the Hybrid Coordinator to the wireless stations either only one time or a selected number of times. The Schedule QoS Management Action Frame 700 is sent to a mobile station when there is at least one admitted traffic stream that originates at the wireless station or at least one admitted traffic stream to be delivered to the wireless station.

The Hybrid Coordinator may send a Schedule QoS Management Action Frame 700 to the wireless station whenever the schedule changes. A service schedule that is received by the wireless station remains valid until it is overwritten by a more recently received service schedule.

Figure 8:
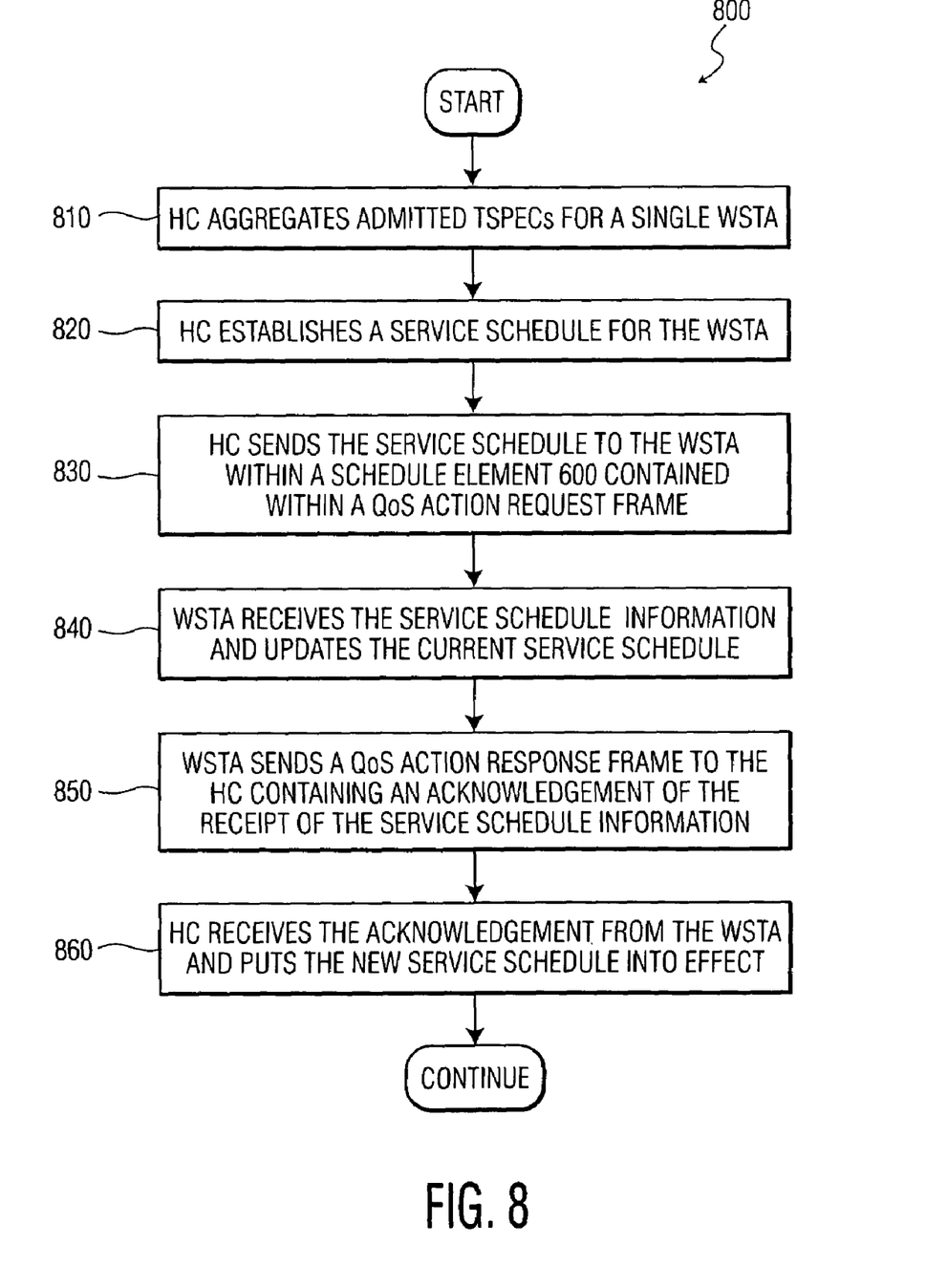
FIG. 8 is a flow chart illustrating an advantageous embodiment of a method of the present invention for providing a Quality of Service (QoS) service schedule and bandwidth allocation message to a wireless station in a wireless local area network (WLAN)

FIG. 8 is a flow chart illustrating an advantageous embodiment of a method of the present invention for providing a Quality of Service (QoS) service schedule and bandwidth allocation message to a wireless station. The steps shown in FIG. 8 are collectively referred to with the reference numeral 800. For the purposes of illustration the wireless station (WSTA) will be assumed to be QSTA 130 and the Hybrid Coordinator (HC) will be assumed to be Hybrid Coordinator 355 co-located in QoS Access Point (QAP) 125.

Hybrid Coordinator (HC) aggregates admitted TSPECs for a single wireless station (WSTA) (step 810). The Hybrid Coordinator (HC) then establishes a service schedule for the wireless station (WSTA) (step 820). The Hybrid Coordinator (HC) then sends the service schedule to the wireless station (WSTA) in a Schedule Element 600 within a QoS Action Request Frame (step 830).

The wireless station (WSTA) receives the service schedule information from the Hybrid Coordinator (HC) and updates the current service schedule within the wireless station (WSTA) (step 840). The wireless station (WSTA) then sends a QoS Action Response Frame to the Hybrid Coordinator (HC) containing an acknowledgement of the receipt of the service schedule information (step 850). The Hybrid Coordinator (HC) receives the acknowledgement from the wireless station (WSTA) and puts the new service schedule into effect (step 860).

Figure 9:
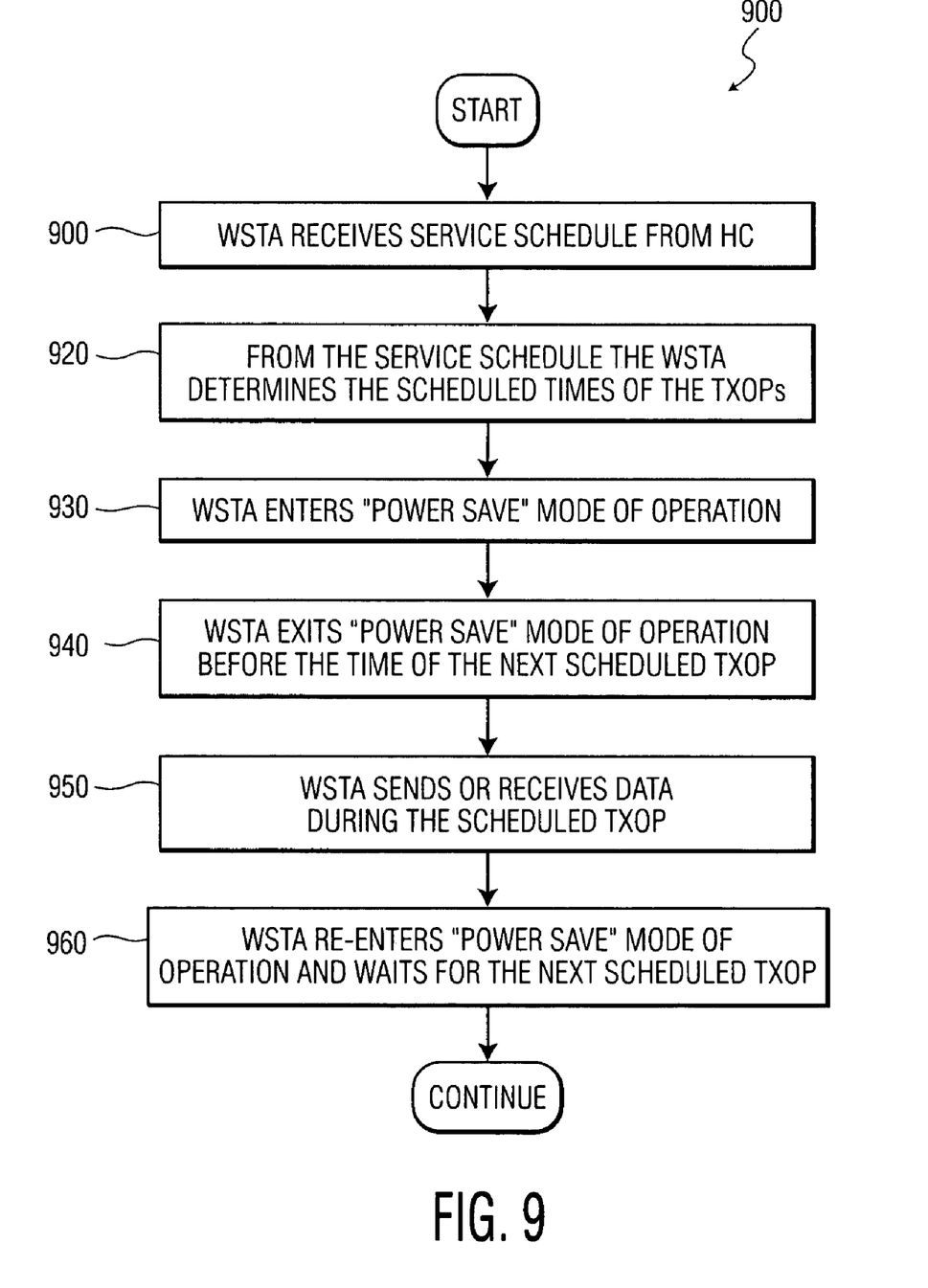
FIG. 9 is a flow chart illustrating an advantageous embodiment of a method of the present invention in which a wireless station uses a Quality of Service (QoS) service schedule to timely enter and leave a "power save" mode of operation.

FIG. 9 is a flow chart illustrating an advantageous embodiment of a method of the present invention in which a wireless station uses a Quality of Service (QoS) service schedule to timely enter and leave a "power save" mode of operation. The steps shown in FIG. 9 are collectively referred to with the reference numeral 900. For the purposes of illustration the wireless station (WSTA) will be assumed to be QSTA 130 and the Hybrid Coordinator (HC) will be assumed to be Hybrid Coordinator 355 co-located in QoS Access Point (QAP) 125.

The wireless station (WSTA) receives a service schedule from the Hybrid Coordinator (HC) (step 910). The wireless station (WSTA) determines the scheduled times of the transmission opportunities (TXOPs) from the service schedule (step 920). The wireless station (WSTA) then enters a "power save" mode of operation to conserve batter power (step 930).

The wireless station (WSTA) then exits the "power save" mode of operation before the time of the next scheduled transmission opportunity (TXOP) (step 940). During the scheduled transmission opportunity (TXOP) the wireless station (WSTA) either sends data or receives data (step 950). Then wireless station (WSTA) re-enters the "power save" mode of operation and waits for the next scheduled transmission opportunity (TXOP) (step 960). The wireless station (WSTA) conserves power by continuing its operation in this manner.

The steps of the method of the present invention may be carried out by computer-executable instructions stored on a computer-readable storage medium such as a DVD or a CD-ROM. Such a computer-readable storage medium is represented schematically in FIG. 3 as CD-ROM disk 390.

Although the present invention has been described in detail, those skilled in the art should understand that they can make various changes, substitutions and alterations herein without departing from the spirit and scope of the invention in its broadest form.

What is claimed is:

1. A method for providing a Quality of Service (QoS) service schedule to a wireless station in a wireless network comprising acts of:
   creating in a hybrid coordinator of said wireless network a Quality of Service (QoS) service schedule for said wireless station;
   sending said QoS service schedule from said hybrid coordinator to said wireless station;

receiving said QoS service schedule in said wireless station;

determining from said QoS service schedule a scheduled time of a transmission opportunity for said wireless station;

placing said wireless station in a power save mode of operation until said scheduled time of said transmission opportunity;

removing said wireless station from said power save mode of operation before said scheduled time of said transmission opportunity; and operating said wireless station to send or receive data during said transmission opportunity.

2. The method as claimed in claim 1 further comprising an act of updating a previous QoS service schedule in said wireless station with said QoS service schedule from said hybrid coordinator.

3. The method as claimed in claim 2 further comprising acts of:

sending an acknowledgement from said wireless station to said hybrid coordinator that said wireless station has received said QoS service schedule from said hybrid coordinator;

receiving said acknowledgement in said hybrid coordinator; and putting said QoS service schedule into effect in said hybrid coordinator.

4. The method as claimed in claim 1 wherein said QoS service schedule further comprises a bandwidth allocation message to said wireless station.

5. The method as claimed in claim 1 wherein said QoS service schedule comprises a schedule element comprising a value of one of: Element ID, Length, Nominal TXOP Duration, Inter TXOP Interval, Inter TXOP Interval, Inter TXOP Jitter Bound, Maximum TXOP Duration, and Minimum TXOP Duration.

6. The method as claimed in claim 1 further comprising an act of placing said wireless station back in said power save mode of operation until an occurrence of a next scheduled transmission opportunity.

7. The method as claimed in claim 1 further comprising an act of sending said QoS service schedule from said hybrid coordinator to said wireless station one of: periodically and aperiodically.

8. The method as claimed in claim 1 further comprising an act of sending said QoS service schedule from said hybrid coordinator to said wireless station a selected number of times.

9. The method as claimed in claim 1 further comprising an act of using information from said QoS service schedule to one of: (1) perform power management in said wireless station and (2) schedule internally queued data in said wireless station.

10. A wireless network capable of providing a Quality of Service (QoS) service schedule to a wireless station in said wireless network, wherein said wireless network is capable of:

creating in a hybrid coordinator of said wireless network a Quality of Service (QoS) service schedule for said wireless station;

sending said QoS service schedule from said hybrid coordinator to said wireless station;

receiving said QoS service schedule in said wireless station;

determining from said QoS service schedule a scheduled time of a transmission opportunity for said wireless station;

placing said wireless station in a power save mode of operation until said scheduled time of said transmission opportunity;

removing said wireless station from said power save mode of operation before said scheduled time of said transmission opportunity; and operating said wireless station to send or receive data during said transmission opportunity.

11. The wireless network as claimed in claim 10 wherein said wireless network is further capable of updating a previous QoS service schedule in said wireless station with said QoS service schedule from said hybrid coordinator.

12. The wireless network as claimed in claim 11 wherein said wireless network is further capable of:

sending an acknowledgement from said wireless station to said hybrid coordinator that said wireless station has received said QoS service schedule from said hybrid coordinator; and receiving said acknowledgement in said hybrid coordinator; and putting said QoS service schedule into effect in said hybrid coordinator.

13. The wireless network as claimed in claim 10 wherein said QoS service schedule further comprises a bandwidth allocation message to said wireless station.

14. The wireless network as claimed in claim 10 wherein said QoS service schedule comprises a schedule element comprising a value of one of: Element ID, Length, Nominal TXOP Duration, Inter TXOP Interval, Inter TXOP Interval, Inter TXOP Jitter Bound, Maximum TXOP Duration, and Minimum TXOP Duration.

15. The wireless network as claimed in claim 10 wherein said wireless network is further capable of placing said wireless station back in said power save mode of operation until an occurrence of a next scheduled transmission opportunity.

16. Computer-executable instructions stored on a computer-readable storage medium for providing a Quality of Service (QoS) service schedule to a wireless station in a wireless network, said computer-executable instructions comprising acts of:

creating in a hybrid coordinator of said wireless network a Quality of Service (QoS) service schedule for said wireless station;

sending said QoS service schedule from said hybrid coordinator to said wireless station;

receiving said QoS service schedule in said wireless station;

determining from said QoS service schedule a scheduled time of a transmission opportunity for said wireless station;

placing said wireless station in a power save mode of operation until said scheduled time of said transmission opportunity;

removing said wireless station from said power save mode of operation before said scheduled time of said transmission opportunity; and operating said wireless station to send or receive data during said transmission opportunity.

17. The computer-executable instructions stored on a computer-readable storage medium as claimed in claim 16 wherein said computer-executable instructions further comprise acts of:

updating a previous QoS service schedule in said wireless station with said QoS service schedule from said hybrid coordinator;

sending an acknowledgement from said wireless station to said hybrid coordinator that said wireless station has received said QoS service schedule from said hybrid coordinator;

receiving said acknowledgement in said hybrid coordinator; and putting said QoS service schedule into effect in said hybrid coordinator.

18. The computer-executable instructions stored on a computer-readable storage medium as claimed in claim 16 wherein said QoS service schedule further comprises a bandwidth allocation message to said wireless station.

19. The computer-executable instructions stored on a computer-readable storage medium as claimed in claim 16 wherein said QoS service schedule comprises a schedule element comprising a value of one of: Element ID, Length, Nominal TXOP Duration, Inter TXOP Interval, Inter TXOP Interval, Inter TXOP Jitter Bound, Maximum TXOP Duration, and Minimum TXOP Duration.

20. The computer-executable instructions stored on a computer-readable storage medium as claimed in claim 16 wherein said computer-executable instructions further comprise an act of placing said wireless station back in said power save mode of operation until an occurrence of a next scheduled transmission opportunity.

* * * * *